United States Patent [19]

Cruze

[11] Patent Number: 4,779,169
[45] Date of Patent: Oct. 18, 1988

[54] CYCLE HAND GRIP WITH RUNNING LIGHT

[75] Inventor: Tyrone A. Cruze, Morgan Hill, Calif.

[73] Assignee: Custom Chrome, Inc., Morgan Hill, Calif.

[21] Appl. No.: 132,780

[22] Filed: Dec. 14, 1987

[51] Int. Cl.⁴ .......................... B62J 6/00; F21V 33/00
[52] U.S. Cl. ...................................... 362/72; 362/191; 74/551.9; 340/134
[58] Field of Search .................... 362/72, 191, 433; 74/551.8, 551.9; 340/134

[56] References Cited

U.S. PATENT DOCUMENTS

| | | | |
|---|---|---|---|
| 2,416,160 | 2/1947 | Davidsson | 177/329 |
| 2,469,944 | 5/1949 | Bauters | 177/329 |
| 2,513,071 | 6/1950 | Wendt | 240/10.61 |
| 2,603,701 | 7/1952 | Schadel | 340/74 |
| 2,793,284 | 5/1957 | Simoneit | 240/7.55 |
| 4,623,954 | 11/1986 | Schott et al. | 362/72 |
| 4,656,564 | 4/1987 | Felder | 362/72 |
| 4,711,381 | 12/1987 | Felder | 362/72 X |
| 4,716,502 | 12/1987 | Schott et al. | 362/72 |

FOREIGN PATENT DOCUMENTS

| | | | |
|---|---|---|---|
| 1111969 | 7/1961 | Fed. Rep. of Germany | 362/72 |
| 405118 | 2/1934 | United Kingdom | 362/72 |

Primary Examiner—Michael Koczo
Assistant Examiner—Richard R. Cole
Attorney, Agent, or Firm—William W. Haefliger

[57] ABSTRACT

A running light assembly is integrated with the end of a motorcycle handle bar and hand grip. The assembly includes a tubular grip sized to fit over a tubular end portion of the cycle handle bar, a nut to be retained at the end of the handle bar, and retained by the grip, an end cap attached to the nut, and a lens carried by the cap in alignment with the end of the handle bar, and means spaced inwardly from the grip to carry a light bulb within the handle bar in alignment with the lens.

12 Claims, 2 Drawing Sheets

CYCLE HAND GRIP WITH RUNNING LIGHT

BACKGROUND OF THE INVENTION

This invention relates generally to warning and safety lights on bicycles and motorcyles, and more particularly concerns the provision of a kit having parts easily assembled to a cycle handle bar end portion, to provide a warning or safety light at said end portion.

It is generally recognize that bicycles and motorcycles should carry safety lights for use at night. There is need for means to provide safety lights on handle bars to delineate their lateral extents, as to passing motorists; and in particular, there is need for an assembly of parts, or parts that can be assembled from a kit, that is easy to install on the end portions of bicycle or motorcycle handle bars, thereby to provide the needed safety light or lights.

SUMMARY OF THE INVENTION

It is a major object of the invention to provide a uniquely and highly advantageous combination of parts that can be assembled, as from a kit, to meet the above need for safety lights on the handle bars of cycles.

Basically, the combination includes:

(a) a tubular grip sized to fit over and attach to a tubular end portion of the cycle handle bar, (b) a lens carried by one end of the grip in alignment with the end of the handle bar, and (c) means spaced inwardly from the grip to carry a light bulb within the handle bar in alignment with the lens.

As will be seen, the grip typically includes a generally cylindrical body having an external surface to be frictionally gripped by the cyclist's hand, and an end cap on said body, the cap being annular and carrying said lens in alignment with an axis defined by the cap and body. Typically, the grip has an annular flange thereon, and a nut is provided to have a flange retained between the grip flange and the end of the handle bar, the cap attached to the nut. In this regard, the cap may have a reduced radius skirt threadably attached to the nut, and an enlarged radius skirt engaging the grip and forming an annular seal therewith; and the grip may have a foam elastomer outermost portion, the cap enlarged radius skirt engaging that outermost portion to form the seal.

Further the light bulb carrying means may advantageously include a spider fitting having flexible cantilevered fingers, sized to forcibly fit into the tubular end portion of the handle bar, for centering the bulb in the tubular end portion; and that spider fitting may advantageously include a split sleeve carrying such fingers, the sleeve having a bore for reception of a light bulb base, and the sleeve being metallic to act as a spring grip for the bulb base. The light bulb has its cylindrical base tightly received by the split sleeve, for good position dr These and other objects and advantages of the invention, as well as the details of an illustrative embodiment, will be more fully understood from the following specification and draiwings, in which:

DRAWING DESCRIPTION

DETAILED DESCRIPTION

Figure 1:
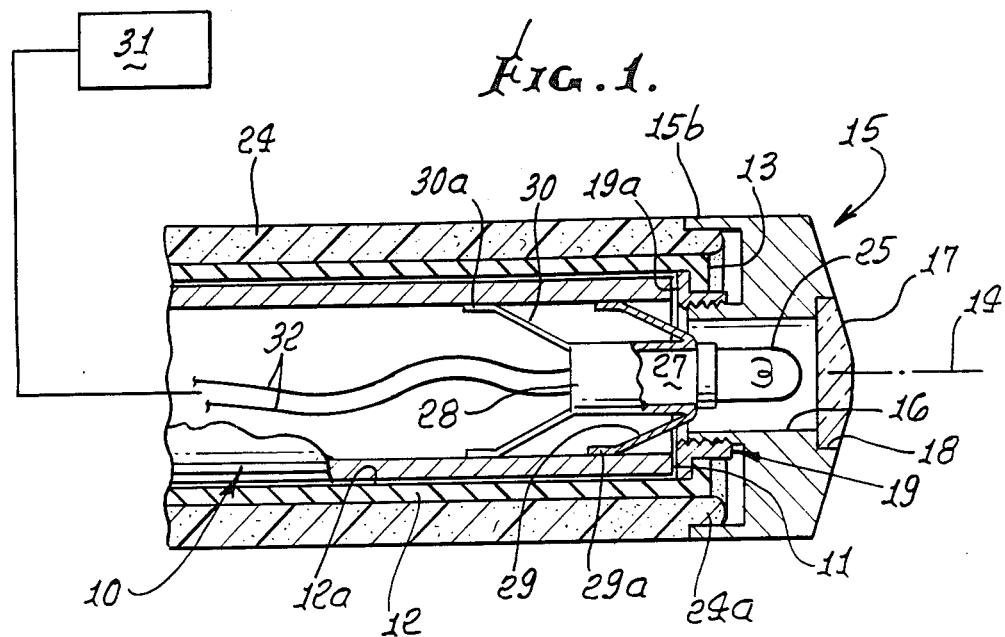
FIG. 1 is a vertical elevation, in section, showing an assembly incorporating the invention.
Figure 2:
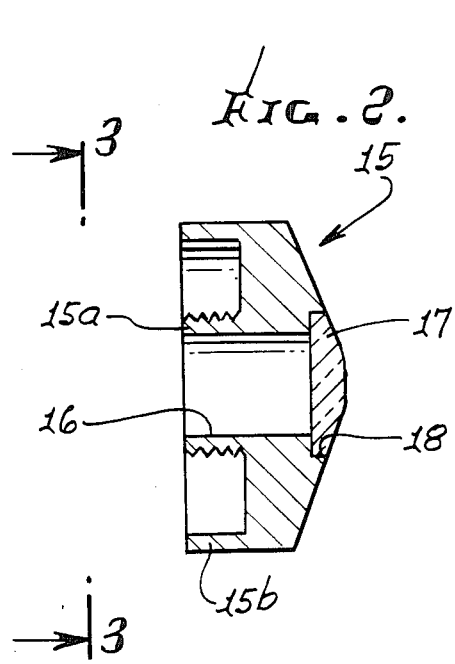
FIG. 2 is an elevation in section showing a cap and lens, as used in the FIG. 1 assembly.
Figure 3:
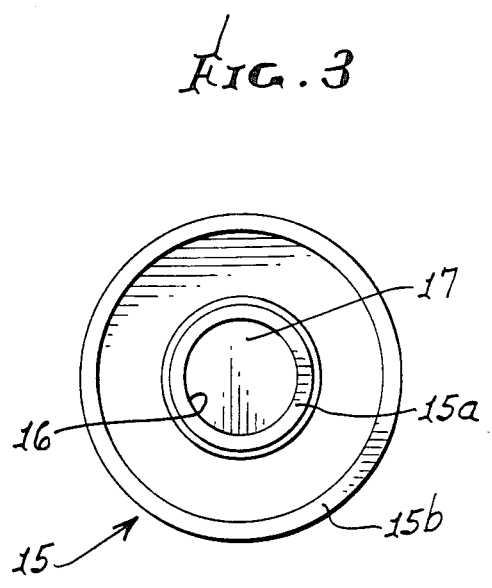
FIG. 3 is an end view on lines 3—3 of FIG. 2.
Figure 4:
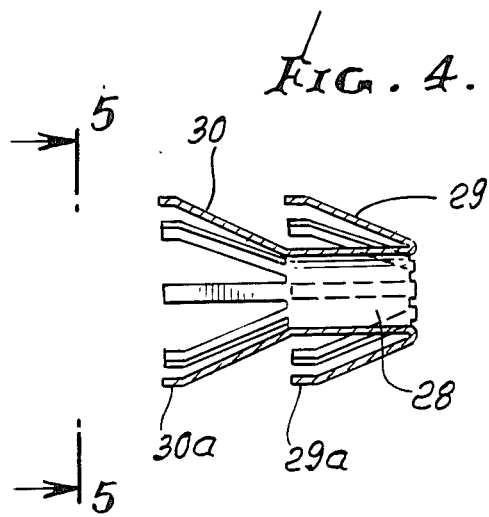
FIG. 4 is a side elevation in section showing a bulb carrier-spring finger unit.

In FIG. 1, a handle bar for a bicycle or motorcycle is shown at 10, and has an annular end terminal 11. The handle bar is typically metallic, and mounted on the handle bar is a tubular grip 12 having an annular flange 13 at its end, turned inwardly toward the axis 14 of the bar 10. The grip may for example consist of hard rubber or other elastomer or synthetic resinous material, and it has a bore 12a that frictionally interfits or may be bonded to the exterior surface of the handle bar. The grip that acts as a throttle is not connected to the handle bar, but rotates relative thereto, and the invention takes account of this. An elastomer foam cover or seleeve 24 may be provided on and effectively attached to the grip for the user's handgripping comfort.

The grip assembly may be considered to include an end cap 15, which is annular to define a bore 16 extending coaxially relative to axis 14, and spaced from the flanged end 13 of the handle bar. The cap carries a lens 17 extending coaxially with the bore 16, and peripherally seated and sealed in a re-entrant recess 18 defined by the cap.

An annular nut 19 has an out-turned flange 19a retained between the grip flange 13 and the end 11 of the handle bar. The nut also has a bore which threadably engages at 20 the exteriorly threaded surface of an axially projecting inner tubular portion 15a of the cap, whereby the nut retains the cap in centered position, as shown. An outer tubular portion 15b of the cap, which also projects axially, protectively and compressively covers a lip 24a of the sleeve 24, and form therewith a tight seal to prevent ingress of rainwater to the interior spaces wherein light bulb 25 is carried.

As shown, the bulb 25 projects axially rightwardly in bore 16, and toward lens 17, the spacing being such that the lens gathers the light rays produced by the bulb, and projects them generally axially, rightwardly. The bulb has a cylindrical base portion 27 that is slidably received within a metallic sleeve 28. The sleeve 28 has conductive spider fingers 29 and 30 projecting rearwardly and outwardly, for engagement with the bore 10a of the handle bar, for centering the bulb. Thus, sleeve 28 is centered in the bore of the handle bar, as shown. Electrical current is delivered to the bulb from a battery (or other) power source 31, as via two wires within the handle bar. Fingers 29 and 30 are spring fingers, resiliently reflected toward axis 14, when received in bore 10a. The contact ends of the fingers at 29a and 30a extend parallel to bore 10a and frictionally grip same.

Figure 6:
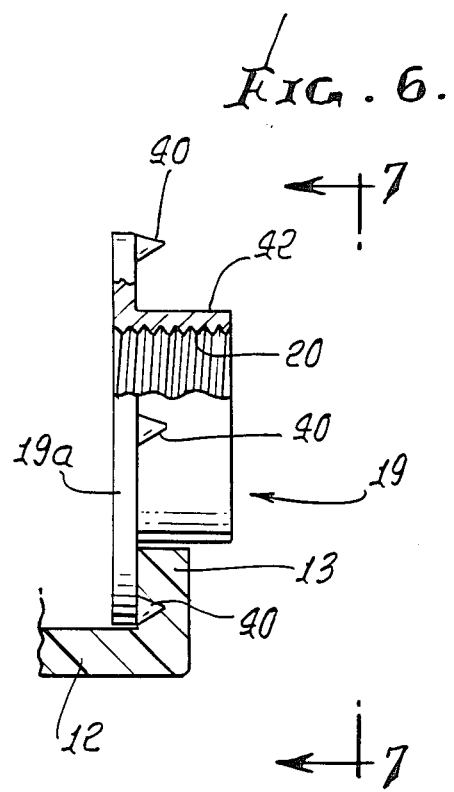
FIG. 6 is a side elevation in section showing a nut.
Figure 7:
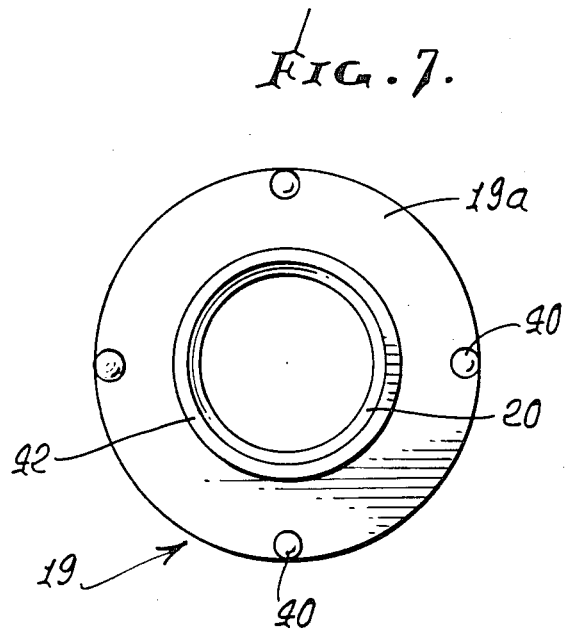
FIG. 7 is an end elevation on lines 7—7 of FIG. 6.

As shown in FIG. 6, the nut flange 19a has tapered prongs 40 thereon, and facing toward the grip flange 13, to axially penetrate same upon assembly, to enhance intergration of the assembly and to center the nut relative to the grip, the grip being itself centered by the handle bar. A tubular boss on the nut appears at 42, and is interiorly threaded, as shown to interfit the cap skirt 15a.

Figure 5:
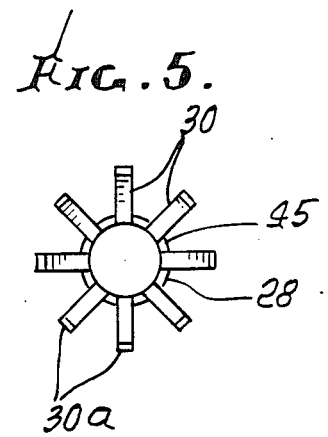
FIG. 5 is an end view on lines 5—5 of FIG. 4.

As seen in FIG. 5, the sleeve 28 is axially split at 45, to have C-shaped cross section. This construction accomodates its tight fit to the bulb base 27, which tends to resiliently enlarge the C-shaped cross section when received in the sleeve. Accordingly, good protective mounting is assured. The fingers 29 and 30 are spaced about the sleeve, as shown.

I claim:

1. Apparatus for providing illumination at the end of a cycle handle bar, comprising
    (a) a tubular grip sized to fit over a tubular end portion of the cycle handle bar,
    (b) a nut to be retained at the end of the handle bar, and retained by the grip, an end cap attached to the nut, and a lens carried by the cap in alignment with the end of the handle bar, and
    (c) means spaced inwardly from the grip to carry a light bulb within the handle bar in alignment with the lens.

2. The apparatus of claim 1 wherein the grip includes a generally cylindrical body having an external surface to be frictionally gripped by the cyclist's hand, the cap being annular and carrying said lens in alignment with an axis defined by the cap and body.

3. The apparatus of claim 1 wherein said means includes a spider fitting having flexible cantilevered fingers, sized to forcibly fit into the tubular end portion of the handle bar, for centering siad bulb relative to said tubular end portion.

4. Apparatus for providing illumination at the end of a cycle handle bar, comprising
    (a) a tubular grip sized to fit over a tubular end portion of the cycle handle bar,
    (b) a lens carried by one end of the grip in alignment with the end of the handle bar, and
    (c) means spaced inwardly from the grip to carry a light bulb within the handle bar in alignment with the lens, said means including a spider fitting having flexible cantilevered fingers, sized to forcibly fit into the tubular end portion of the handle bar, for centering said bulb relative to said tubular end portion, the spider fitting including a split sleeve carrying said fingers, the sleeve having a bore for reception of a light bulb base and the sleeve being metallic to grip the bulb base.

5. The apparatus of claim 4 wherein there are two axially spaced sets of said fingers on the sleeve, the fingers extending axially and radially outwardly relative to the sleeve, and also being spaced about the sleeve.

6. The apparatus of claim 5 including said light bulb having its base fittingly received and clamped by the split sleeve.

7. Apparatus for providing illumination at the end of a cycle handle bar, comprising
    (a) a tubular grip sized to fit over a tubular end portion of the cycle handle bar,
    (b) a lens carried by one end of the grip in alignment with the end of the handle bar, and
    (c) means spaced inwardly from the grip to carry a light bulb within the handle bar in alignment with the lens,
    (c) the grip including a generally cylindrical body having an external surface to be frictionally gripped by the cyclist's hand, and an end cap carried by said body, the cap being annular and carrying said lens in alignment with an axis defined by the cap and body, the grip having an annular flange thereon, and including a nut having a flange retained between the grip flange and the end of the handle bar, the cap attached to the nut.

8. The apparatus of claim 7 wherein the cap has a reduced radius skirt threadably attached to the nut, and an enlarged radius skirt engaging the grip and forming an annular seal therewith.

9. The apparatus of claim 8 wherein the grip includes a foam elastomer outermost portion, the cap enlarged radius skirt engaging said outermost portion to form said seal.

10. The apparatus of claim 9 including said light bulb openly extending into a bore formed by said cap.

11. The apparatus of claim 10 including circuitry receivable within the handle bar for conducting electrical current to the bulb, the circuitry operatively connected to the bulb.

12. The apparatus of claim 7 wherein the grip flange is elastomeric, and the nut has tapered projections that penetrate into the nut flange, to center the nut relative to the grip which is on the handle bar.

* * * * *